US012406377B2

(12) United States Patent
Aberman et al.

(10) Patent No.: US 12,406,377 B2
(45) Date of Patent: Sep. 2, 2025

(54) TECHNIQUES FOR REDUCING A DISTRACTION IN AN IMAGE

(71) Applicant: Google LLC, Mountain View, CA (US)

(72) Inventors: Kfir Aberman, San Mateo, CA (US); David Edward Jacobs, Mountain View, CA (US); Kai Jochen Kohlhoff, Mountain View, CA (US); Michael Rubinstein, Natick, MA (US); Yossi Gandelsman, Berkeley, CA (US); Junfeng He, Fremont, CA (US); Inbar Mosseri, Raanana (IL); Yael Pritch Knaan, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 428 days.

(21) Appl. No.: 17/856,370

(22) Filed: Jul. 1, 2022

(65) Prior Publication Data

US 2023/0015117 A1    Jan. 19, 2023

Related U.S. Application Data

(60) Provisional application No. 63/218,096, filed on Jul. 2, 2021.

(51) Int. Cl.
  *G06T 11/00* (2006.01)
  *G06T 3/18* (2024.01)
  (Continued)

(52) U.S. Cl.
  CPC ............... *G06T 7/194* (2017.01); *G06T 3/18* (2024.01); *G06T 7/11* (2017.01); *G06T 11/001* (2013.01);
  (Continued)

(58) Field of Classification Search
  CPC .......... G06T 2207/20084; G06V 10/82; G06V 10/462; G06V 10/945
  See application file for complete search history.

(56) References Cited

U.S. PATENT DOCUMENTS

2012/0093402 A1* 4/2012 Staelin ................ G06V 10/462
382/165
2012/0179433 A1* 7/2012 Wivell ................... G06T 17/05
703/2

(Continued)

OTHER PUBLICATIONS

Fried rt al., Finding distractors in images, 2015 IEEE Conference on Computer Vision and Pattern Recognition (CVPR), Boston, MA, USA, 2015, pp. 1703-1712, doi: 10.1109/CVPR.2015.7298779, AAPA furnished via IDS.*

(Continued)

*Primary Examiner* — Guillermo M Rivera-Martinez
(74) *Attorney, Agent, or Firm* — DORITY & MANNING P.A.

(57) ABSTRACT

Techniques for tuning an image editing operator for reducing a distractor in raw image data are presented herein. The image editing operator can access the raw image data and a mask. The mask can indicate a region of interest associated with the raw image data. The image editing operator can process the raw image data and the mask to generate processed image data. Additionally, a trained saliency model can process at least the processed image data within the region of interest to generate a saliency map that provides saliency values. Moreover, a saliency loss function can compare the saliency values provided by the saliency map for the processed image data within the region of interest to one or more target saliency values. Subsequently, the one or more parameter values of the image editing operator can be modified based at least in part on the saliency loss function.

20 Claims, 7 Drawing Sheets

(51) Int. Cl.
   G06T 7/11      (2017.01)
   G06T 7/194     (2017.01)
   G06V 40/20     (2022.01)

(52) U.S. Cl.
   CPC .... *G06V 40/20* (2022.01); *G06T 2207/20081* (2013.01); *G06T 2207/20084* (2013.01)

(56) References Cited

U.S. PATENT DOCUMENTS

| | | | | |
|---|---|---|---|---|
| 2013/0148854 | A1* | 6/2013 | Wang | G06F 18/2433 382/103 |
| 2014/0072208 | A1* | 3/2014 | Kenyon | G06V 10/422 382/199 |
| 2020/0402243 | A1* | 12/2020 | Benou | G06T 7/11 |

OTHER PUBLICATIONS

Xiong et al., Foreground-Aware Image Inpainting, 2019 IEEE/CVF Conference on Computer Vision and Pattern Recognition (CVPR), 2019, pp. 5833-5841, doi: 10.1109/CVPR.2019.00599.*

Mechrez et al., Saliency driven image manipulation, 2018 IEEE Winter Conference on Applications of Computer Vision, 2018, pp. 1368-1376, doi: 10.1007/s00138-018-01000-w, AAPA furnished via IDS.*

Xiao et al., Deep Salient Object Detection With Dense Connections and Distraction Diagnosis, IEEE Transactions on Multimedia, vol. 20, No. 12, Dec. 2018, pp. 3239-3251, DOI: 10.1109/TMM.2018.2830098.*

MIT/Tuebingen Saliency Benchmark, https://saliency.tuebingen.ai/, retrieved on Aug. 18, 2022, 2 pages.

Borji. Saliency Prediction in the Deep Learning Era: Successes and Limitations and Future Challenges, arXiv:1810.03716v3, May 24, 2019, 44 pages.

Bylinskii et al, "Learning Visual Importance for Graphic Designs and Data Visualizations", arXiv:1708.02660v1, Aug. 8, 2017, 13 pages.

Cerf et al, "Faces and Text Attract Gaze Independent of the Task: Experimental Data and Computer Model", Journal of Vision, vol. 9, No. 12, 2009, 15 pages.

Chen et al, "Bilateral Guided Upsampling", ACM Transactions on Graphics, vol. 35, No. 6, Nov. 2016, 8 pages.

Chen et al, "Guide Your Eyes: Learning Image Manipulation Under Saliency Guidance", British Machine Vision Conference, Sep. 9-12, 2019, Cardiff, United Kingdom, 12 pages.

Chu et al, Camouflage Images. ACM Transactions on Graphics, vol. 29, No. 4, Article 51, Jul. 2010, 8 pages.

Cornia et al, "Paying More Attention to Saliency: Image Captioning with Saliency and Context Attention", arXiv:1706.08474v4, May 21, 2018, 21 pages.

Fan et al, "Emotional Attention: A Study of Image Sentiment and Visual Attention", Conference on Computer Vision and Pattern Recognition, Jun. 18-22, 2018, Salt Lake City, Utah, United States, pp. 7521-7531.

Fried et al, "Finding Distractors in Images", Conference on Computer Vision and Pattern Recognition, Jun. 7-12, 2015, Boston, Massachusetts, United States, 10 pages.

Frintrop et al, "Computational Visual Attention Systems and Their Cognitive Foundations: A survey", AMC Transactions on Applied Perception, vol. 7, No. 1, 2010, 46 pages.

Gatys et al, "Image Style Transfer Using Convolutional Neural Networks", Conference on Computer Vision and Pattern Recognition, Jun. 26-Jul. 1, 2016, Las Vegas, Nevada, United States, pp. 2414-2423.

Gatys et al, "Guiding Human Gaze with Convolutional Neural Networks", arXiv:1712.06492v1, Dec. 18, 2017, 12 pages.

Ghosh et al., "Saliency guided image detail enhancement", 2019 National Conference on Communications (NCC), 2019, 6 pages.

Gu et al, "Automatic contrast enhancement technology with saliency preservation", IEEE Transactions on Circuits and Systems for Video Technology, vol. 25, No. 9, 2014, pp. 1480-1494.

Hagiwara et al, "Saliency-Based Image Editing for Guiding Visual Attention", International Workshop on Pervasive Eye Tracking & Mobile Eye-Based Interaction, Sep. 7-21, 2011, Beijing, China, pp. 43-48.

Huang et al, "SALICON: Reducing the Semantic Gap in Saliency Prediction by Adapting Deep Neural Networks", International Conference on Computer Vision, Dec. 11-15, 2015, pp. 262-270.

Itti, "Visual Salience", Scholarpedia, http://www.scholarpedia.org/article/Visual_salience, retrieved on Aug. 19, 2022, 9 pages.

Itti et al, Computational Modelling of Visual Attention. Nature Reviews Neuroscience, vol. 2, 2001, pp. 194-203.

Jia et al, "EML-NET: An Expandable Multi-Layer NETwork for Saliency Prediction", arXiv:1805.01047v2, Mar. 11, 2019, 10 pages.

Jiang et al, "SALICON: Saliency in Context", Conference on Computer Vision and Pattern Recognition, Jun. 7-15, 2005, Boston, Massachusetts, 9 pages.

Johnson, et al, "Perceptual Losses for Real-Time Style Transfer and Super-Resolution", arXiv:1603.08155v1, Mar. 27, 2016, 18 pages.

Karras et al, "A Style-Based Generator Architecture for Generative Adversarial Networks", arXiv:1812.04948v3, Mar. 29, 2019, 12 pages.

Kingma et al, "Adam: A Method for Stochastic Optimization", arXiv:1412.6980v9, Jan. 30, 2017, 15 pages.

Koch et al, "Shifts in Selective Visual Attention: Towards the Underlying Neural Circuitry", Human Neurobiology, 1985, pp. 219-227.

Kümmerer et al, "Deep Gaze I: Boosting Saliency Prediction with Feature Maps Trained on ImageNet", arXiv:1411.1045v4, Apr. 9, 2015, 12 pages.

Kummerer et al, "Understanding Low-and High-Level Contributions to Fixation Prediction", International Conference on Computer Vision, Oct. 22-29, 2017, Venice, Italy, pp. 4789-4798.

Le Meur et al, Methods for Comparing Scanpaths and Saliency Maps: Strengths and Weaknesses. Behavior Research Methods, vol. 45, 2013, pp. 251-266.

Mateescu et al, "Attention Retargeting by Color Manipulation in Images", International Workshop on Perception Inspired Video Processing, Nov. 3-7, 2014, Orlando, Florida, United States, 6 pages.

Mechrez et al, "Saliency Driven Image Manipulation", arXiv:1612.02184v3, Jan. 17, 2018, 9 pages.

Mejjati et al, "Look Here! A Parametric Learning Based Approach to Redirect Visual Attention", arXiv:2008.05413v1, Aug. 12, 2020, 32 pages.

Patel et al, "Saliency Driven Perceptual Image Compression", arXiv:2002.04988v2, Nov. 8, 2020, 10 pages.

Dmitry Ulyanov et al, "Deep Image Prior", arXiv:1711.10925v4, May 17, 2020, 23 pages.

Valliappan et al, "Accelerating Eye Movement Research via Accurate and Affordable Smartphone Eye Tracking", Nature Communications, vol. 11, 2020, 12 pages.

Wolfe et al, What Attributes Guide the Deployment of Visual Attention and How Do They Do It? Nature Reviews Neuroscience, vol. 5, 2004, 7 pages.

Wolfe et al, Five Factors that Guide Attention in Visual Search. Nature Human Behaviour, vol. 1, Mar. 8, 2017, 8 pages.

Wong et al, "Saliency Retargeting: An Approach to Enhance Image Aesthetics", Workshop on Applications of Computer Vision, Jan. 5-7, 2011, Kona, Hawaii, United States, 8 pages.

Yu et al, "LSUN: Construction of a Large-Scale Image Dataset Using Deep Learning with Humans in the Loop", arXiv:1506.03365v3, Jun. 4, 2016, 9 pages.

Zhang et al, "The Application of Visual Saliency Models in Objective Image Quality Assessment: A Statistical Evaluation", Transactions On Neural Networks And Learning Systems, vol. 27, 2015, 13 pages.

\* cited by examiner

TECHNIQUES FOR REDUCING A DISTRACTION IN AN IMAGE

FIELD

The present disclosure relates generally to reducing distractions in an image. More particularly, the present disclosure relates to a machine-learned model for a differentiable image editing operator and a saliency model to distractions in an area of an image.

BACKGROUND

Image data (e.g., photograph, video) and other forms of data often include a distraction that can capture the eye-gaze of a user. As one example, the distraction can correspond to a distracting object (e.g., clutter in the background of a room) that distracts from the main subject (e.g., main speaker participating in a video call). As another example, the unwanted data could correspond to an unsightly object in an otherwise pristine portrait photograph of a user.

Thus, distractions can correspond to objects which grab a user's visual attention away from the main subject of the image. However, replacing the distractions is a challenging problem because the image edits may need to be drastic but also realistic.

SUMMARY

Aspects and advantages of embodiments of the present disclosure will be set forth in part in the following description, or can be learned from the description, or can be learned through practice of the embodiments.

The present disclosure provides systems and methods which use a saliency model trained to predict human eye-gaze to drive a range of powerful editing effects for reducing distraction in images, without any additional supervision necessary. Given an image and a region to edit, embodiments of the present disclosure can reduce distraction as an optimization over a composition of a differentiable image editing operator and a state-of-the-art saliency model. The raw image data can be processed by using several operators, including, but not limited to a recoloring operator, a warping operator, a generative adversarial network (GAN) operator. The recoloring operator can apply a color transform that camouflages and blends distractors into their surroundings. The warping operator can warp less salient image regions to cover distractors, gradually collapsing objects into themselves, and effectively removing the distractors (e.g., an effect akin to inpainting). The GAN operator can use a semantic prior to fully replace image regions with plausible, less salient alternatives. The resulting effects are consistent with cognitive research on the human visual system (e.g., since color mismatch is salient, the recoloring operator learns to harmonize objects' colors with their surroundings to reduce their saliency), and, importantly, can be achieved solely through the guidance of the pretrained saliency model, with no additional training data.

One example aspect of the present disclosure is directed to a computer-implemented method for tuning (e.g., modifying, configuring) an image editing operator to reduce a distractor from an image. For example, tuning can include modifying or configuring one or more of the parameter values of the image editing operator. The method can include accessing the raw image data and a mask. The mask can indicate a first location associated with the raw image data. The method can further include processing, by one or more computing devices, the raw image data and the mask with an image editing operator to generate the processed image data. The method can further include processing the processed image data with a trained saliency model to generate a saliency map. Additionally, the method can include determining a saliency loss function based on the saliency map and the first location indicated by the mask. Moreover, the method can include modifying one or more parameter values of the image editing operator based at least in part on the saliency loss function.

In some implementations, the method can further include evaluating, by the one or more computing devices, a similarity loss function that compares the raw image data outside the region of interest and the processed image data outside the region of interest. Additionally, the method can include modifying, by the one or more computing devices, one or more parameter values of the image editing operator based at least in part on the similarity loss function.

In some implementations, the one or more target saliency values can equal zero.

In some implementations, the saliency loss function can provide a loss that is positively correlated with a difference between the saliency values provided by the saliency map for the processed image data within the region of interest and the one or more target saliency values.

In some implementations, the image editing operator can include a generative adversarial network (GAN) operator.

In some implementations, the image editing operator can be a recoloring operator. Additionally, the raw image data can be processed by the image editing operator by applying a color transform to the distractor so that the distractor is blended into a surrounding area in the processed image data.

In some implementations, the image editing operator is a warping operator. Additionally, the raw image data can be processed by the warping operator by warping a surrounding area around the distractor so that the distractor is covered by the warped surrounding area in the processed image data.

In some implementations, the trained saliency model can be previously trained on a set of training data comprising a plurality of training saliency maps respectively associated with a plurality of training images. Additionally, the training saliency map for each training image indicates location of human eye gaze relative to the training image.

In some implementations, the raw image data includes a two-dimensional photograph. Alternatively, in some implementations, the raw image data can include a video with a static background, and the region of interest indicated by the mask corresponds to the static background.

Another example aspect of the present disclosure is directed to a computer-implemented method for tuning an image editing operator for reducing a distractor in raw image data. For example, tuning can include modifying or configuring one or more of the parameter values of the image editing operator. The method can include accessing the raw image data and a mask. The mask can indicate a region of interest associated with the raw image data. The method can further include processing, by the one or more computing devices, the raw image data and the mask with an image editing operator to generate processed image data. The method can further include processing at least the processed image data within the region of interest with a trained saliency model to generate a saliency map that provides saliency values for at least the processed image data within the region of interest. Additionally, the method can include evaluating a saliency loss function that compares the saliency values provided by the saliency map for the processed image data within the region of interest to one or more target saliency values. Moreover, the method can include modifying one or more parameter values of the image editing operator based at least in part on the saliency loss function.

Another example aspect of the present disclosure is directed to a computing system having one or more processors and one or more non-transitory computer-readable image that collectively store an image editing operator, a trained saliency model, and instructions. The image editing operator can be configured to process image data. The trained saliency model can be configured to generate a saliency map using processed image data. The instructions, when executed by the one or more processors, cause the computing system to perform operations. The operations can include accessing raw image data and a mask. The mask can indicate a region of interest associated with the raw image data. The operations can further include processing, using the image editing operator, the raw image data and the mask to generate processed image data. The operations can include processing, using the trained saliency model, the processed image data to generate a saliency map. The operations can include determining a saliency loss function based on the saliency map and the region of interest indicated by the mask. The operations can include modifying one or more parameter values of the image editing operator based at least in part on the saliency loss function.

In some implementations, the operations can further include determining a similarity loss function based on a comparison of the raw image data and the processed image data. Additionally, the operations can include modifying one or more parameter values of the image editing operator based at least in part on the similarity loss function.

In some implementations, the determination of the similarity loss function is limited to portions of the raw image data and the processed image data outside of the region of interest indicated by the mask. Additionally, a first saliency associated with the region of interest indicated by the mask can be lower than a second saliency associated with image regions outside the region of interest indicated by the mask.

In some implementations, the image editing operator is a GAN operator. The raw image data can be processed by the GAN operator using a semantic prior to replace an image region of the raw image data associated with the second location indicated by the mask.

In some implementations, the distractor can be in the region of interest indicated by the mask. In some implementations, the raw image data can include a two-dimensional photograph.

Another example aspect of the present disclosure is directed to one or more non-transitory computer-readable media that collectively store a machine-learned image editing operator. The image editing operator can be learned by performance of operations. The operations can include accessing raw image data and a mask, where the mask indicates a region of interest associated with the raw image data. Additionally, the operations can include processing the raw image data and the mask with the image editing operator to generate processed image data. Moreover, the operations can include processing the processed image data with a trained saliency model to generate a saliency map. Furthermore, the operations can include determining a saliency loss function based on the saliency map and the region of interest indicated by the mask. Subsequently, the operations can include modifying one or more parameter values of the image editing operator based at least in part on the saliency loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

The present disclosure is directed to systems and methods that use machine learning to edit an image by reducing distractions. For example, reducing a distraction can include the performance of one or more image editing operators such as recoloring, warping, replacement pixel generation, etc. In some implementations, the image editing operators can result in removal of an undesired object from an image and the filling in of the image at the location of the removed undesired object and/or other forms of reducing the visual attention afforded to an undesired portion of the image.

Systems and methods of the present disclosure may utilize machine learning technology to learn an image editing operator which performs improved editing of an image to remove a distraction from the image. Specifically, example systems and methods of the present disclosure can leverage a pre-trained saliency model to train the image editing operator to successfully reduce saliency within a region of interest.

In some implementations, the saliency model can be trained or have been pre-trained based on eye-gaze data. The eye-gaze data can include the location of an image that is being viewed by a user, which can be used to determine human visual attention.

Having obtained a trained saliency model, the image editing operator can then be trained on raw image data, processed image data, and a mask. The processed image data can be raw image data that has been processed by the image editing operator. The mask (e.g., a binary pixel mask) can indicate the region of interest associated with the raw image data (e.g., the region in which it is desired to reduce visual distraction).

The systems and methods of the present disclosure provide several technical effects and benefits. As one example, the machine learning system can aid in computing performance by refining parameters of the image editing operator for processing the raw image data into processed image data. Thus, the performed image editing can be higher quality (e.g., more accurate) than previous techniques, which represents an improvement in the performance of a computing system.

Additionally, the proposed approaches may eliminate the need to create or perform multiple different edits on an image to achieve a desired effect. For example, certain existing techniques may require trial and error using a number of different stock editing operations until a desired result is achieved. The systems and methods can instead directly learn an image editing operator that achieves the desired effect. By reducing the number of editing operations that need to be performed, the systems and methods of the present disclosure can result in savings of computing resources such as processor usage, memory usage, and/or network bandwidth usage.

The use of raw image data, processed image data, saliency maps, and masks also removes confusion from the tuning and makes the tuning more efficient, thereby conserving computing resources. The trained system may reduce the amount of computing resources utilized versus previous systems. Certain less efficient approaches to image editing may attempt to learn to mimic human edits in a supervised fashion. Instead, the present disclosure leverages access to a pre-trained saliency model to drive learning of the image editing operator. The techniques described herein may not require any hand labeling or additional data generation, thereby enabling training to be performed more efficiently.

As the implementation of machine learning also eliminates the need to manually edit every occurrence of a distraction in an image, more efficiency may be added. The system may also eliminate the need for a coder to write code, run the code, refine the code, and continually supervise performance.

Additionally, techniques described herein allows for editing images to decrease human attention for the purpose of reducing visual distraction, but also increasing human attention to a main subject. For example, the image editing model leverages deep saliency models to drive drastic, but still realistic, edits, which can significantly change an observer's attention to different regions in the image. This capability can have important applications, such as photography, where pictures often contain objects that distract from the main subject(s) we want to portray, or in video conferencing, where clutter in the background of a room or an office may distract from the main speaker participating in the call. The image editing model utilizes the knowledge embedded in deep saliency models to drive and direct editing of images and videos to tweak the attention drawn to different regions in them.

The image editing approaches described herein can include an optimization framework for guiding visual attention in images using a differentiable, predictive saliency model. The image editing approaches can employ a state-of-the-art deep saliency model, pre-trained on large-scale saliency data. For example, given an input image and a distractor mask, the learning process can backpropagate through the saliency model to parameterize an image editing operator, such that the saliency within the masked region is reduced. The space of suitable operators in such a framework is, however, bounded. In some instances, the problem lies in the saliency predictor—as with many deep learning models, the parametric space of saliency predictors is sparse and prone to failure if out-of-distribution samples are produced in an unconstrained manner. By using a careful selection of operators and priors, the proposed systems can achieve natural and realistic editing via gradient descent on a single objective function.

Several differentiable operators can be used, including the following examples: two standard image editing operations (whose parameters are learned through the saliency model), namely recolorization and image warping (shift); and two learned operators (these editing operation are not explicitly defined), namely a multi-layer convolution filter, and a generative model (GAN). With those operators, the proposed framework can produce a variety of powerful effects, including recoloring, inpainting, detail attenuation, tone attenuation, camouflage, object editing, object insertion, and facial attribute editing. Importantly, all these effects can be driven solely by the single, pretrained saliency model, without any additional supervision or training.

Techniques described herein demonstrate how image editing operations can be guided by the knowledge of visual attention embedded within deep saliency models. The implemented image editing model shows that the produced image edits can effectively reduce the visual attention drawn to the specified regions; maintain the overall realism of the images; and can be significantly more preferred by users over more subtle saliency-driven editing effects that conventional systems.

With reference now to the Figures, example embodiments of the present disclosure will be discussed in further detail.

Example Devices and Systems

Figure 1A:
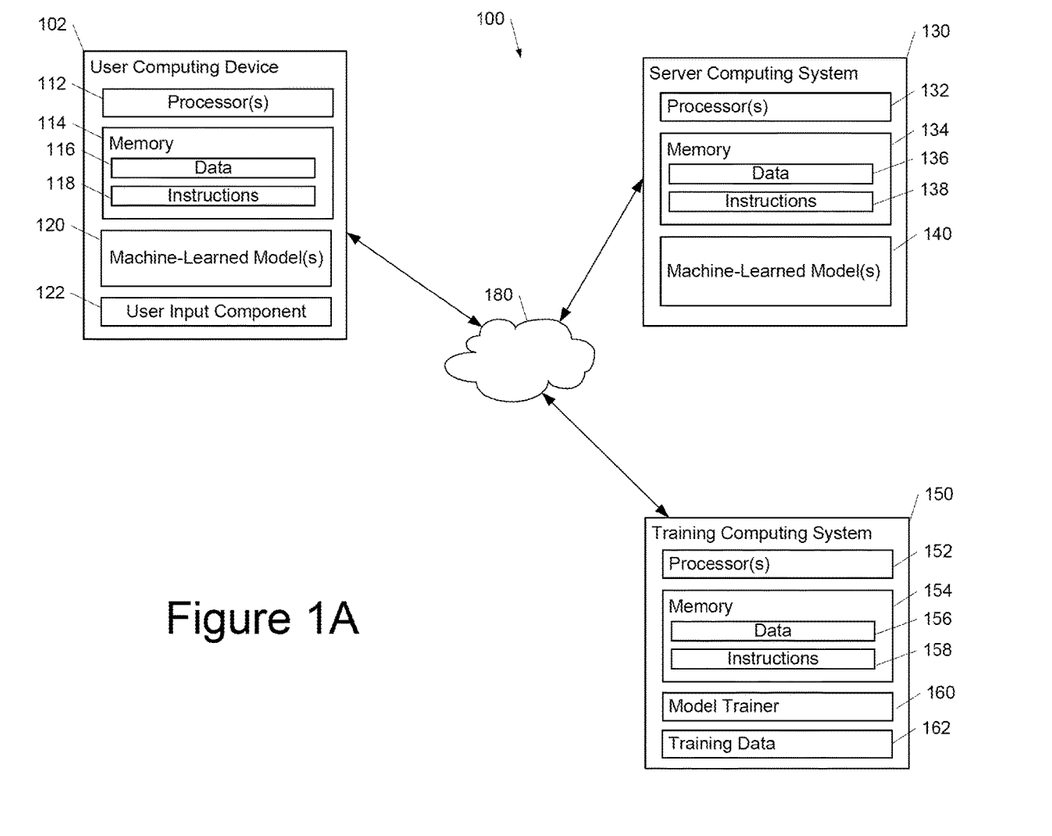
FIG. 1A depicts a block diagram of an example computing system according to example embodiments of the present disclosure.

FIG. 1A depicts a block diagram of an example computing system 100 that performs image editing according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more image editing models 120. For example, the image editing models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. In other examples, the image editing models 120 can be specific image editing operators which are differentiable, and which have been parameterized to facilitate application of machine learning techniques. Example image editing models 120 are discussed with reference to FIGS. 2 and 3.

In some implementations, the one or more image editing models 120 can be received from the server computing system 130 over network 180, stored in the user computing device memory 114, and then used or otherwise implemented by the one or more processors 112. In some implementations, the user computing device 102 can implement multiple parallel instances of a single image editing model 120 (e.g., to perform parallel generation of predicted replacement data or other image edits across multiple instances of unwanted data in a set of data).

More particularly, the image editing model can be trained using a training module with a set of training data to train the parameters of the model (e.g., image editing operator, saliency model) to optimize the generation of predicted data. The training module may rely on eye-gaze data to add efficiency and precision to the training module (e.g., to train the saliency model). Training data may also include the creation of processed image data from raw image data (e.g., to train the image editing operator). Masks may also be used in training to provide a region of interest or a marker for the size and location of the unwanted data.

The image editing model may take the machine-learned data from the training module to aid the inference module. The inference module may intake user data in which the user data includes raw image data that may include a distractor. The inference module may then generate processed image data based on the raw image data and a mask in which the processed image data may have removed or reduced the distractor. The server may contain the machine-learned data to aid in the generation of the processed image data.

Additionally, or alternatively, one or more image editing models 140 can be included in or otherwise stored and implemented by the server computing system 130 that communicates with the user computing device 102 according to a client-server relationship. For example, the image editing models 140 can be implemented by the server computing system 130 as a portion of a web service (e.g., an image editing service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned image editing models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2, 3, and 4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the image editing models 120 and/or 140 based on a set of training data 162. The training data 162 can include, for example, a set of raw image data, a set of processed image data, and a set of masks to indicate the region of interest, and a set of saliency maps.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
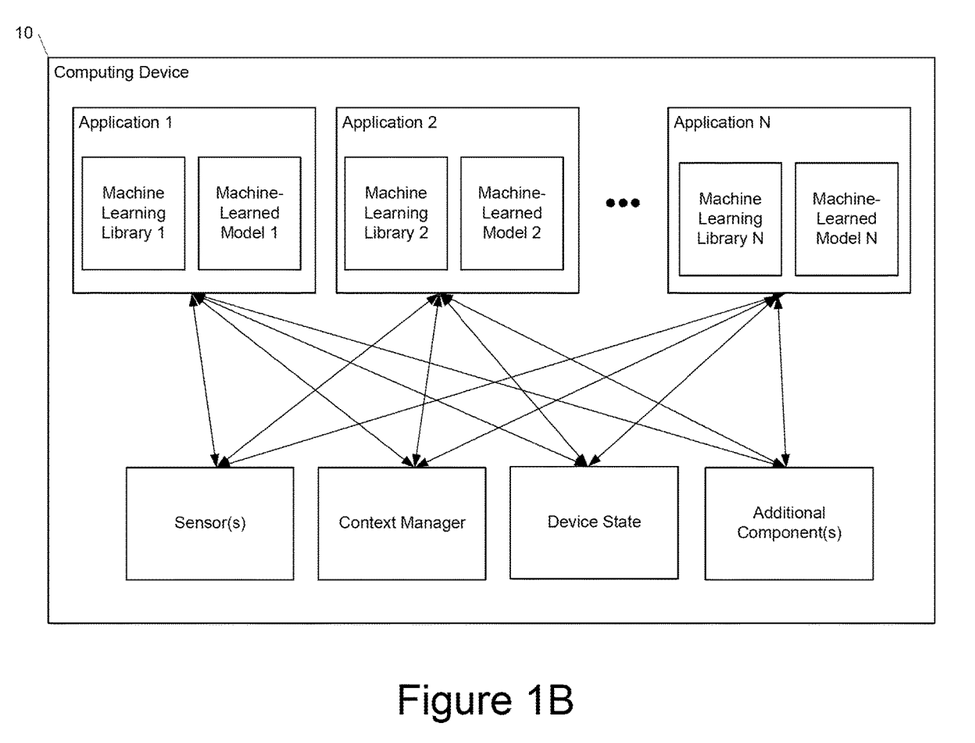
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
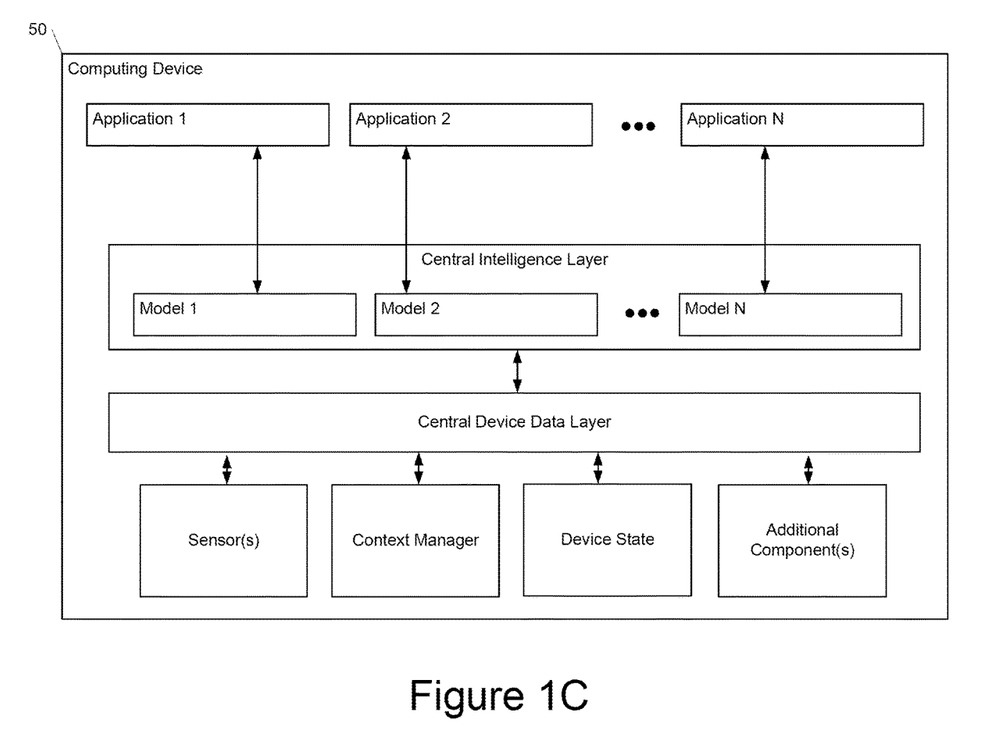
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
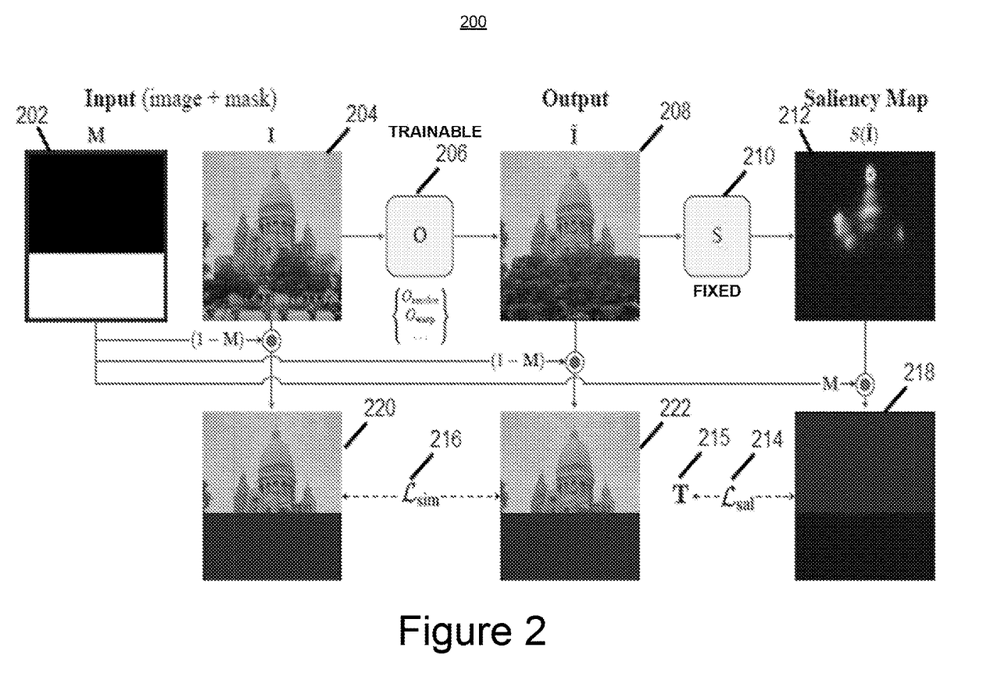
FIG. 2 depicts a block diagram of an example tuning process to train an image editing operator according to example embodiments of the present disclosure.

FIG. 2 depicts a block diagram of an example technique 200 to train an image editing operator 206 according to example embodiments of the present disclosure. In some implementations, the image editing operator 206 is trained to receive raw image data 204. As illustrated in the example in FIG. 2, the raw image data 204 can be a two-dimensional photograph of a building with some trees in the front of the building. The image editing operator 206 can process the raw image data 204 to generate processed image data 208.

In some implementations, given an input image I, a region of interest mask M, and an operator $O \in \{O_{recolor}, O_{warp}, O_{GAN}, \ldots\}$, the system can generate an image with high-fidelity to the input image outside of the mask ($\mathcal{L}_{sim}$), and with reduced saliency inside it ($\mathcal{L}_{sal}$). The target saliency is typically selected to be T=0.

The input to the training process can also include a mask 202. The mask 202 can indicate a region of interest (e.g., white box in mask 202) associated with the raw image data.

For example, the image editing operator 206 can be a recoloring operator, where the raw image data 204 is processed by the image editing operator 206 by applying a color transform to a distractor so that the distractor is blended into a surrounding area in the processed image data. In another example, the image editing operator 206 can be a warping operator, where raw image data 204 is processed by the warping operator by warping a surrounding area around a distractor so that the distractor is covered by the warped surrounding area in the processed image data. In yet another example, the image editing operator 206 can be a generative adversarial network (GAN) operator.

Additionally, a trained saliency model 210 can process the processed image data 208 to generate a saliency map 212. In some instances, the trained saliency model 210 can process only the processed image data within the region of interest to generate a saliency map that provides saliency values only the processed image data within the region of interest. In other instances, the trained saliency model 210 can process all of the processed image data to generate a saliency map that provides saliency values for all of the processed image data.

Moreover, the training technique 200 can include evaluating a saliency loss function 214 that compares the saliency values 218 provided by the saliency map 212 for the processed image data within the region of interest to one or more target saliency values 215. In one example, the target saliency values 215 can equal zero. In other examples in which saliency is desired to be increased, the target saliency values 215 can be positively valued (e.g., greater than zero).

Subsequently, based on the comparison, the training technique 200 can include modifying one or more parameter values of the image editing operator 206 based at least in part on the saliency loss function 214.

In some instances, the training technique 200 can further include evaluating a similarity loss function 216 that compares the raw image data outside the region of interest 220 and the processed image data outside the region of interest 222. Subsequently, based on the evaluation, the training technique 200 can include modifying one or more parameter values of the image editing operator 206 based at least in part on the similarity loss function 216.

In some implementations, the saliency loss 214 and the similarity loss 216 can be used jointly as terms of a single, shared objective function to train the image editing operator 206.

Modifications can be made to one or more parameters of the image editing operator 206 based on the evaluation data and comparison data (e.g., based on the saliency loss function 216, based on the similarity loss function 216). For example, the loss function(s) can be backpropagated through the models and the parameters of the models can be changed according to a gradient of the loss function(s). In some implementations, this process may be done iteratively to train the model over a number of different training examples or to iteratively optimize the parameters for a single image/example.

In some instances, the computing system can evaluate a similarity loss function that compares the raw image data outside the region of interest and the processed image data outside the region of interest. Based on the evaluation, the computing system can modify or more parameter values of the image editing operator based at least in part on the similarity loss function.

Given an input image I and a region of interest M, the objective of the system is to manipulate the content of I such that the attention drawn to region M is modified while keeping high-fidelity to the original image in other areas. The system follows the guidance of a saliency prediction model that was pretrained to identify attention grabbing regions based on saliency data. Additionally, the model seeks to find an image I that solves the following, two-term optimization equations with a saliency model S(•) that predicts a spatial map (per-pixel value in the range of [0,1]), and a target saliency map T. ||•|| and ○ represent the $L_2$ norm and the Hadamard product, respectively.

$$\arg\min_I \mathcal{L}_{sal}(I)+\beta \mathcal{L}_{sim}(I), \quad \text{equation (1)}$$

where $$\mathcal{L}_{sal}(I)=\|M\circ(S(I)-T)\|^2 \text{ and } \mathcal{L}_{sim}(I)=\|(1-M)\circ(I-I)\|^2, \quad \text{equation (2)}$$

In some implementations, the system can typically use T≡0 to reduce the saliency within the region of interest. However, T can be an arbitrary map, so saliency can be increased (e.g., by setting T≡1) or set to specific values in the range [0,1].

Given that existing saliency models are trained on natural images, a naïve manipulation of the image pixels guided by Eq. (1) can easily converge into "out-of-distribution" outputs. For instance, if additive noise is applied to the pixels within M and optimized with T≡0, the output may exhibit salient regions which are interpreted as non-salient by the model, as shown in FIG. 2.

In some implementations, to prevent convergence into the vacant regions of the saliency model, the system can constrain the solution space of I by substituting I=$O_\theta$(I) in Eq. (1), where $O_\theta$ is a pre-defined differentiable operator with a set of parameters θ that are used as the optimization variables. The constrained objective function can be written as:

$$\arg\min_\theta \mathcal{L}_{sal}(O_\theta(I))+\beta \mathcal{L}_{sim}(O_\theta(I))+\gamma\Gamma(\theta), \quad \text{equation (3)}$$

where Γ(•) is a regularization function that is applied to θ, with weight γ.

Constraints imposed by using specific operators enable that the manipulated images remain within the valid input domain of the saliency model where its predictive power is useful. Additionally, different operators $O_\theta$ can yield different effects, hand-crafted or learned, that comply with cognitive perception principles. The results can be achieved by a gradient descent optimization, however, the framework can be converted to a per-operator feed forward network, once trained on scale, as done in other domains such as image style transfer.

In the recolorization operation, the system, using a recolorization operator, can first aim at solving a re-colorization task by maintaining the luminosity of the region of interest while modifying its chromatic values (e.g., 'ab' components in the CIELab color representation) in order to reduce saliency. Here, $O_\theta$ is a recolor operator that applies a per-pixel affine transform on the 'ab' channels of the input image. The map is represented by a grid θ∈ $\mathbb{R}^{B\times B\times 6}$, that contains B×B affine transforms. Additionally, the system can apply the map to the image in two differentiable steps. In the first step, the system can extract the affine transforms corresponding to each pixel by querying the grid with the 'ab' value of the pixels. For example, a pixel with chromatic values (a, b), that lies in the (i, j)-th bin, yields the following affine transform in equation 4, where $w_i$(a, b), i∈{0,1,2,3} are bilinear weights that are dictated by the relative position of (a, b) within the bin, and $T_{(a,b)}\in \mathbb{R}^6$ is a vector that can be reshaped into the rotation A∈ $\mathbb{R}^{2\times 2}$ and translation b∈ $\mathbb{R}^2$ parts of the affine transform.

$$T_{(a,b)}=w_0(a,b)\theta(i,j)+w_1(a,b)\theta(i+1,j)+w_2(a,b)\theta(i,j+1)+w_3(a,b)\theta(i+1,j+1), \quad \text{equation (4)}$$

Continuing with the recolorization operation, the extracted transformation can be applied to the pixel via (a' b')=(a b)A+b, where (a', b') are the output chromatic values. In addition, to encourage color changes to be piecewise smooth, the system can add a smoothness term in the form of an isotropic total variation (TV) loss, $\Gamma(\theta)=\|\nabla_a\theta\|_1+\|\nabla_b\theta\|_1$, where $\nabla_a$ and $\nabla_b$ represent the gradients of the grid with respect to the chroma axes a and b, respectively.

In the warping operation, the system, using a warping operator, can find a 2D warping field that modifies the saliency of the target region once applied to the image. Here $O_\theta$ is a warp operator, represented by a sparse set of control points $\theta$ that are uniformly populated over the image grid. Each control point contains a 2D coordinate that indicates its displacement to the corresponding source pixel. The warp can be accomplished in two steps. The system can first upsample the low-resolution grid $\theta$ to the full image size using bilinear interpolation to get the upsampled warp field W, then the system can apply W to the source image. The output value of each pixel is computed by equation 5, where $(\tilde{i},\tilde{j})=W(i, j)+(i,j)$, and $w_i$, $i\in\{0,1,2,3\}$ are bilinear weights, that are dictated by the relative position of $(\tilde{i},\tilde{j})$ within the bin.

$$I(i,j)=w_0(\tilde{i},\tilde{j})I(\tilde{i},\tilde{j})+w_1(\tilde{i},\tilde{j})I(\tilde{i}+1,\tilde{j})+w_2(\tilde{i},\tilde{j})I(\tilde{i},\tilde{j}+1)+w_3(\tilde{i},\tilde{j})I(\tilde{i}+1,\tilde{j}+1),$$ equation (5)

Due to the differentiability of the operators, the gradients can be backpropagated through this chain, enabling calculation of the optimal warping field with respect to equation (3). In addition, to enable better propagation of pixels warped from the exterior region into the interior region of the mask, in each iteration the input image is updated by the warped image I→I. A similar smoothness term to one added to the recolor operator is applied to the warping field. The system demonstrates that the warp operator tends to remove the object, as it solves an image inpainting problem under unsupervised setting, namely, replacing the foreground object with a natural completion of the background with no explicit self-supervision. Unnatural completion of the background, or mismatch in texture, are interpreted as attention grabbing regions by the saliency model.

Figure 3:
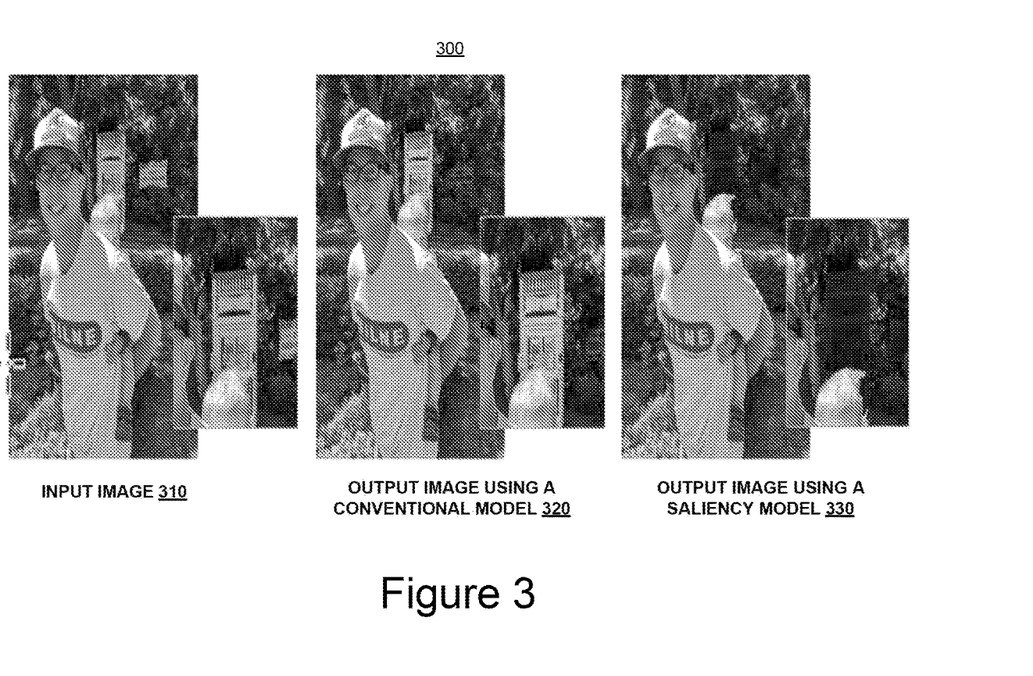
FIG. 3 depicts an illustration of processing an input image using a conventional model in comparison to using a saliency model according to example embodiments of the present disclosure.

In the image-to-image operator, the system can use a learning convolutional network. In some instances, the system can use an untrained deep convolutional neural network as an image-to-image operator. For example, the network consists of a plurality (e.g., five) convolution layers followed by non-linearity (ReLU), where $\theta$ represents the weights of the convolution kernels. Since deep networks may represent a large set of functions, the model can easily converge into an out-of-domain example. Thus, $\mathcal{L}_{sim}$ plays a key role in maintaining the solution in the valid region of the model. In some implementations, in the first plurality (e.g., 50) iterations the network weights are optimized to only reconstruct the original image (identity mapping), then the saliency objective is added. As a result, the network learns to camouflage prominent objects, and blend them with the background. Additionally, the network selects to adapt colors of regions that are associated with the background, even when multiple regions are presented nearby the region of interest including foreground objects or subjects. Although the network is optimized on a single image, the saliency model that was trained on many examples refer background colors to lower saliency, and guides the network to transfer colors of background regions. To demonstrate this point, we calculate a naïve baseline which adapts the colors of the surrounding pixels into the marked regions. The chromatic channels were replaced by the most dominant chromatic values of the surrounding pixels, and the brightness is translated such that its average is equal to the average brightness of the surrounding pixels. As illustrated in FIG. 3, the conventional approach cannot distinguish between foreground and background pixel values, while the saliency model described herein is able to distinguish between foreground and background pixel values by relying on the guidance of the saliency model.

FIG. 3 depicts an illustration 300 of processing an input image 310 using a conventional model 320 in comparison to using a saliency model 330 according to example embodiments of the present disclosure. FIG. 3 depicts a comparison against a naïve method for adaptation of background colors. The input image 310 includes a sign and post in the background, and the system aims to reduce the saliency of the sign and post in the background. The output image using conventional model 320 includes replacing the chromatic channels with the dominant chromatic values of the surrounding pixels and equalizing the average brightness level with the surrounding pixels by a translation. The sign and post are still visible in the output image using conventional model 320. In contrast, in the output image with a saliency model 330, the sign and post are no longer visible. The output image using a saliency model 330 can be generated using techniques described herein. For example, the deep saliency method can include using the deep convolutional operator or the image-to-image operator.

In some implementations, the system can utilize a GAN (e.g., StyleGAN) as a natural image prior. The system can further constrain the solution space to the set of natural image patches that can fill the region of interest in a semantically aware manner. The system can incorporate a domain specific pre-trained StyleGAN generator (e.g., human faces, towers, churches), that enables generation of high-quality images from a learned latent distribution and define $\theta$ to be a latent vector in the $\mathcal{W}$ space [23].

Given an image $I_{w_0}=G(w_o)$ that was generated by a generator G with a latent code $w_0\in\mathcal{W}$, the system can initialize $\theta$ to be $\theta_0=w_0$, and optimize it with respect to equation 3. In some instances, to avoid our-of-distribution solutions the output image can be restricted to lay in the $\mathcal{W}$ space, by $I=G(\theta)$. The optimization guides the latent code into directions that maintain the details of the image anywhere outside the region of interest but modify the region's content in a semantically meaningful manner that affects the saliency. For example, to reduce the saliency of a structure that contains fine grained details (e.g., arcs, poles, and windows), the saliency model guides the network to cover the structure by trees. In addition, the saliency model can remove facial accessories such as glasses and to close the eyes of a person as illustrated in FIG. 4, which comply with cognitive perception principles.

Figure 4:
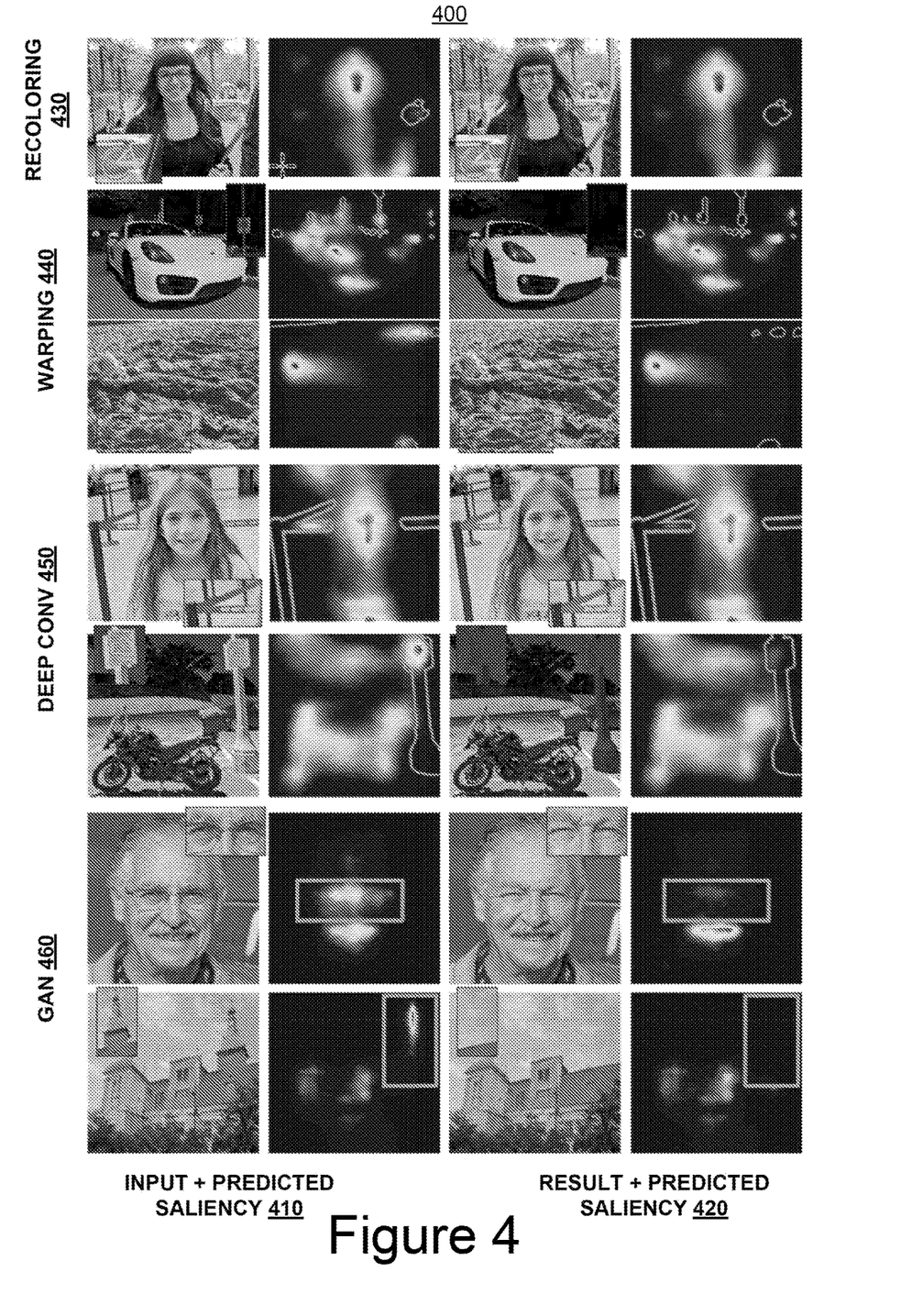
FIG. 4 depicts an illustration of input images with predicted saliency and result images with predicted saliency according to example embodiments of the present disclosure.

FIG. 4 depicts an illustration 400 of input images with predicted saliency 410 and result images with predicted saliency 420 according to example embodiments of the present disclosure. The illustration 400 depicts additional results of reducing visual distractions, guided by the saliency model with several operators (e.g., recoloring 430, warping 440, deep convolutional 450, GAN 460). The region of interest can be marked on top of the saliency map (i.e., border) in each example.

While increasing the saliency of a region can be solved in various ways with the operators described herein (e.g., 'recolor' can modify the colors of the region to be shiny and unnatural, and warp can lead to unnatural attention-grabbing distortions), the dense latent space of StyleGAN contains a variety of meaningful directions that result in saliency increase. For instance, the saliency model can guide the network to add facial details such as a mustache to increase the saliency in the mouth region and add prominent geometric structures such as domes to churches.

Example Methods

Figure 5:
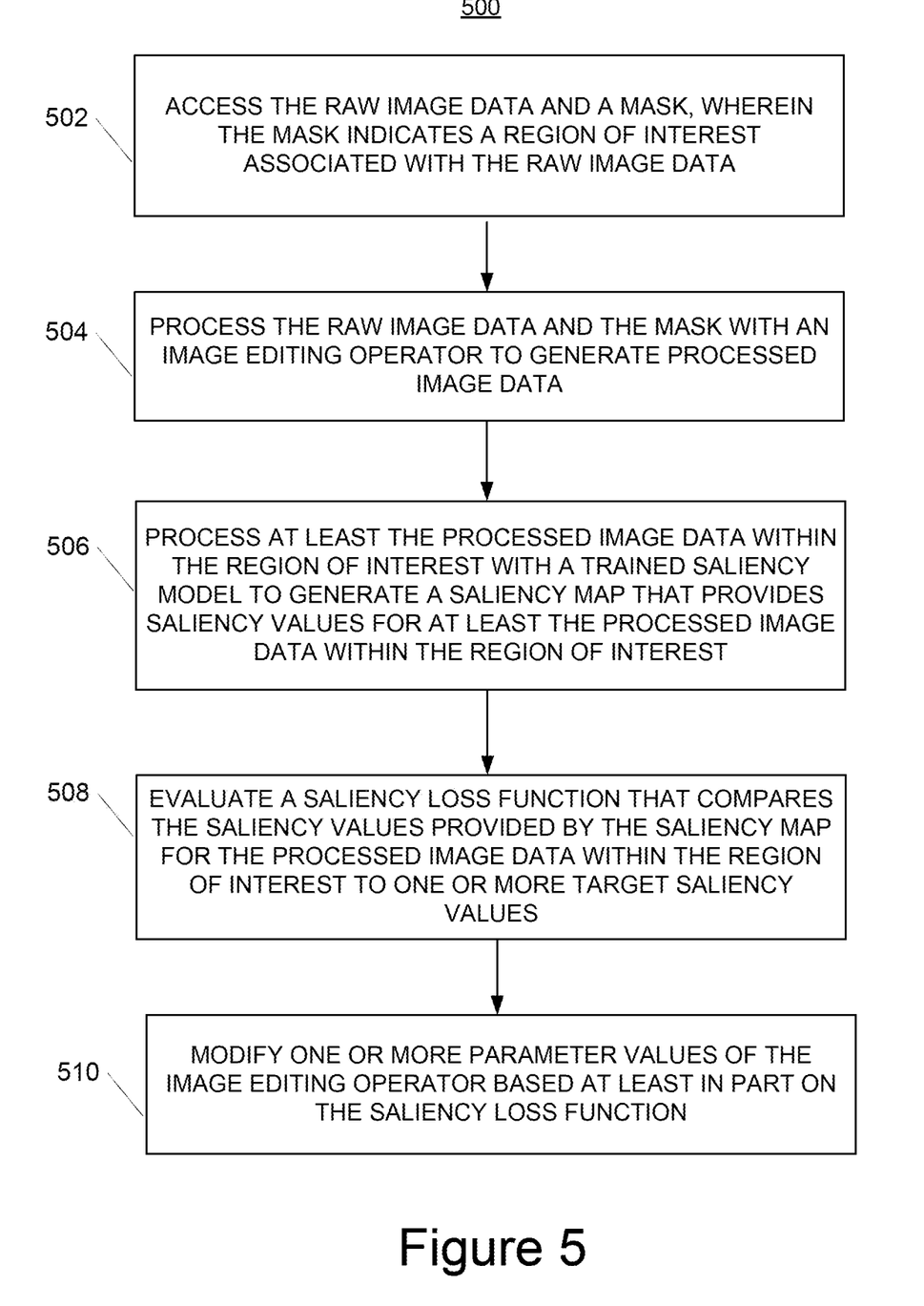
FIG. 5 depicts a flow chart of an example method to train an image editing operator according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can access raw image data and a mask. The mask can indicate a region of interest associated with the raw image data. The raw image data can include a two-dimensional photograph. Additionally, in another example, the raw image data can include a video with a static background, where the region of interest indicated by the mask corresponds to the static background.

At 504, the computing system can process the raw image data and the mask with an image editing operator to generate processed image data. In one example, the image editing operator can be a generative adversarial network (GAN) operator. In another example, the image editing operator can be a recoloring operator, where the raw image data is processed by the image editing operator by applying a color transform to the distractor so that the distractor is blended into a surrounding area in the processed image data. In yet another example, the image editing operator can be a warping operator, where the raw image data is processed by the warping operator by warping a surrounding area around the distractor so that the distractor is covered by the warped surrounding area in the processed image data. In some instances, the image editing operator can be a combination of the GAN operator, the recoloring operator, the warping operator, and any other image editing operator.

At 506, the computing system can process at least the processed image data within the region of interest with a trained saliency model to generate a saliency map that provides saliency values for at least the processed image data within the region of interest. In some instances, the trained saliency model has been previously trained on a set of training data comprising a plurality of training saliency maps respectively associated with a plurality of training images, wherein the training saliency map for each training image indicates location of human eye gaze relative to the training image.

At 508, the computing system can evaluate a saliency loss function that compares the saliency values provided by the saliency map for the processed image data within the region of interest to one or more target saliency values. For example, the one or more target saliency values can equal zero. Additionally, the saliency loss function can provide a loss that is positively correlated with a difference between the saliency values provided by the saliency map for the processed image data within the region of interest and the one or more target saliency values.

At 510, the computing system can modify one or more parameter values of the image editing operator based at least in part on the saliency loss function.

In some implementations, the computing system can process an input image using the image editing operator to generate an output image, as illustrated in FIGS. 3 and 4. In some instances, the image editing operator can include a saliency model to reduce distractions in a background of an image or video.

Additional Disclosure

The technology discussed herein refers to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for configuring an image editing operator for reducing a distractor in raw image data, the method comprising:
   accessing, by one or more computing devices, the raw image data and a mask, wherein the mask indicates a region of interest associated with the raw image data;
   processing, by the one or more computing devices, the raw image data and the mask with the image editing operator to generate processed image data;
   processing, by the one or more computing devices, at least the processed image data within the region of interest with a trained saliency model to generate a saliency map that provides saliency values for at least the processed image data within the region of interest;
   evaluating, by the one or more computing devices, a saliency loss function that compares the saliency values provided by the saliency map for the processed image data within the region of interest to one or more target saliency values; and
   modifying, by the one or more computing devices, one or more parameter values of the image editing operator for processing the raw image data into the processed image data based at least in part on the saliency loss function to reduce the distractor in the raw image.

2. The computer-implemented method of claim 1, further comprising:
   evaluating, by the one or more computing devices, a similarity loss function that compares the raw image data outside the region of interest and the processed image data outside the region of interest; and
   modifying, by the one or more computing devices, the one or more parameter values of the image editing operator based at least in part on the similarity loss function.

3. The computer-implemented method of claim 1, wherein the one or more target saliency values equal zero.

4. The computer-implemented method of claim 1, wherein the saliency loss function provides a loss that is positively correlated with a difference between the saliency values provided by the saliency map for the processed image data within the region of interest and the one or more target saliency values.

5. The computer-implemented method of claim 1, wherein the image editing operator comprises a generative adversarial network (GAN) operator, and wherein the raw image data is processed by the GAN operator using a semantic prior to replace an image region of the raw image data associated with a second location indicated by the mask.

6. The computer-implemented method of claim 1, wherein the image editing operator is a recoloring operator, and wherein the raw image data is processed by the image editing operator by applying a color transform to the distractor so that the distractor is blended into a surrounding area in the processed image data.

7. The computer-implemented method of claim 1, wherein the image editing operator is a warping operator, and wherein the raw image data is processed by the warping operator by warping a surrounding area around the distractor so that the distractor is covered by the warped surrounding area in the processed image data.

8. The computer-implemented method of claim 1, wherein the trained saliency model has been previously trained on a set of training data comprising a plurality of training saliency maps respectively associated with a plurality of training images, wherein the training saliency map for each training image indicates location of human eye gaze relative to the training image.

9. The computer-implemented method of claim 1, wherein the raw image data comprises a two-dimensional photograph.

10. The computer-implemented method of claim 1, wherein the raw image data comprises a video with a static background, and wherein the region of interest indicated by the mask corresponds to the static background.

11. A computing system, comprising:
one or more processors;
one or more non-transitory computer-readable image that collectively store;
an image editing operator, wherein the image editing operator is configured to process image data;
a trained saliency model, wherein the trained saliency model is configured to generate a saliency map; and
instructions that, when executed by the one or more processors, cause the computing system to perform operations, the operations comprising:
accessing raw image data and a mask, wherein the mask indicates a region of interest associated with the raw image data;
processing, using the image editing operator, the raw image data and the mask to generate processed image data;
processing, using the trained saliency model, the processed image data to generate the saliency map;
determining a saliency loss function based on the saliency map and the region of interest indicated by the mask; and
modifying one or more parameter values of the image editing operator for processing the raw image data into the processed image data based at least in part on the saliency loss function.

12. The computer system of claim 11, the operations further comprising:
determining a similarity loss function based on a comparison of the raw image data and the processed image data; and
modifying the one or more parameter values of the image editing operator based at least in part on the similarity loss function.

13. The computer system of claim 12, wherein determination of the similarity loss function is limited to portions of the raw image data and the processed image data outside of the region of interest indicated by the mask.

14. The computer system of claim 13, wherein a first saliency associated with the region of interest indicated by the mask is lower than a second saliency associated with image regions outside the region of interest indicated by the mask.

15. The computer system of claim 11, wherein the image editing operator is a generative adversarial network (GAN) operator, and wherein the raw image data is processed by the GAN operator using a semantic prior to replace an image region of the raw image data associated with a second location indicated by the mask.

16. The computer system of claim 11, wherein the image editing operator is a recoloring operator, and wherein the raw image data is processed by the image editing operator by applying a color transform to a distractor so that the distractor is blended into a surrounding area in the processed image data.

17. The computer system of claim 11, wherein the image editing operator is a warping operator, and wherein the raw image data is processed by the warping operator by warping a surrounding area around a distractor so that the distractor is covered by the warped surrounding area in the processed image data.

18. The computer system of claim 11, wherein a distractor is in the region of interest indicated by the mask.

19. The computer system of claim 11, wherein the raw image data comprises a two-dimensional photograph.

20. One or more non-transitory computer-readable media that collectively store a machine-learned image editing operator, wherein the image editing operator has been learned by performance of operations, the operations comprising:
accessing raw image data and a mask, wherein the mask indicates a region of interest associated with the raw image data;
processing the raw image data and the mask with the image editing operator to generate processed image data;
processing the processed image data with a trained saliency model to generate a saliency map;
determining a saliency loss function based on the saliency map and the region of interest indicated by the mask; and
modifying one or more parameter values of the image editing operator for processing the raw image data into the processed image data based at least in part on the saliency loss function.

* * * * *